United States Patent
Deffley et al.

(10) Patent No.: US 11,809,372 B2
(45) Date of Patent: Nov. 7, 2023

(54) FILTERING AND FEEDS

(71) Applicant: Awes.me, Inc., Mountain View, CA (US)

(72) Inventors: Evan Deffley, Mountain View, CA (US); Ian Brown, Mountain View, CA (US)

(73) Assignee: AWES.ME, INC., Mountain View, CA (US)

( * ) Notice: Subject to any disclaimer, the term of this patent is extended or adjusted under 35 U.S.C. 154(b) by 0 days.

(21) Appl. No.: 17/075,346

(22) Filed: Oct. 20, 2020

(65) Prior Publication Data

US 2021/0141762 A1 May 13, 2021

Related U.S. Application Data (63) Continuation of application No. 15/864,408, filed on Jan. 8, 2018, now Pat. No. 10,810,158.

(60) Provisional application No. 62/539,962, filed on Aug. 1, 2017, provisional application No. 62/452,031, filed on Jan. 30, 2017.

(51) Int. Cl.
  *G06F 16/14* (2019.01)
  *G06F 16/9535* (2019.01)

(52) U.S. Cl.
  CPC .......... *G06F 16/148* (2019.01); *G06F 16/156* (2019.01); *G06F 16/9535* (2019.01)

(58) Field of Classification Search
  CPC .................................................. G06F 16/148
  USPC ......................................................... 378/62
  See application file for complete search history.

(56) References Cited

U.S. PATENT DOCUMENTS

| | | | |
|---|---|---|---|
| 7,669,123 | B2 | 2/2010 | Zuckerberg et al. |
| 7,827,208 | B2 | 11/2010 | Bosworth et al. |
| RE44,207 | E | 5/2013 | Schneider |
| 8,874,557 | B2 | 10/2014 | Lin et al. |
| 10,810,158 | B2 | 10/2020 | Deffley |

(Continued)

FOREIGN PATENT DOCUMENTS

| | | | |
|---|---|---|---|
| WO | WO-2006049924 A2 * | 5/2006 | ............. G06Q 99/00 |
| WO | WO 2011/093946 | 8/2011 | |
| WO | WO 2018/140712 | 8/2018 | |

OTHER PUBLICATIONS

PCT Application No. PCT/US2018/015424 International Preliminary Report on Patentability dated Jul. 30, 2019; 7 pages.

(Continued)

*Primary Examiner* — Syling Yen
(74) *Attorney, Agent, or Firm* — POLSINELLI LLP (57) ABSTRACT

Embodiments disclosed herein generally relate to a method for searching a database. The application receives an input identifying one or more users. The application matches the input to one or more user accounts, each user account corresponding to a user that was identified. The application presents to a requestor public accounts of each identified user account. The application receives a keyword input that filters one or more files in the public accounts. The application receives an input that saves a search comprising the user accounts and the keyword input. The application queries the database using the search. The application presents to the requestor a list of all files found using the search. The application dynamically updates the list to include new files matching a criteria of the search as new files satisfying the search are uploaded to the database.

19 Claims, 9 Drawing Sheets

(56) References Cited

U.S. PATENT DOCUMENTS

| | | | |
|---|---|---|---|
| 2008/0034020 A1 | 2/2008 | Hayakawa | |
| 2008/0065701 A1 | 3/2008 | Lindstrom et al. | |
| 2011/0004831 A1 | 1/2011 | Steinberg et al. | |
| 2011/0173283 A1 | 7/2011 | Puthenklam et al. | |
| 2012/0203838 A1 | 8/2012 | Zuckerberg et al. | |
| 2012/0239731 A1 | 9/2012 | Shyamsunder et al. | |
| 2013/0036171 A1 | 2/2013 | Gilbert | |
| 2013/0212495 A1 | 8/2013 | Zuckerberg et al. | |
| 2013/0326562 A1 | 12/2013 | Bi et al. | |
| 2014/0053204 A1 | 2/2014 | Milano | |
| 2014/0164365 A1* | 6/2014 | Graham | G06Q 50/01 707/723 |
| 2015/0113101 A1* | 4/2015 | Kim | G06F 16/24 709/219 |
| 2016/0042069 A1* | 2/2016 | Lee-Goldman | G06F 40/295 707/706 |
| 2016/0321570 A1 | 11/2016 | Engle | |
| 2016/0343037 A1* | 11/2016 | Nicholas | H04L 67/306 |

OTHER PUBLICATIONS

PCT Application No. PCT/US2018/015424 International Search Report and Written Opinion dated May 11, 2018; 13 pages.
U.S. Appl. No. 15/864,408 Final Office Action dated Mar. 9, 2020.
U.S. Appl. No. 15/864,408 Office Action dated Oct. 25, 2019.

\* cited by examiner

FILTERING AND FEEDS

CROSS-REFERENCE TO RELATED APPLICATIONS

This application is a continuation and claims the priority benefit of U.S. patent application Ser. No. 15/864,408, filed Jan. 8, 2018, now U.S. Pat. No. 10,810,158, which claims the priority benefit of U.S. provisional patent application 62/539,962, filed Aug. 1, 2017, and U.S. provisional patent application 62/452,031, filed Jan. 30, 2017, all of which are incorporated by reference in their entirety.

BACKGROUND

1. Field

Embodiments of the present disclosure generally relate to a system and method for querying a database of media files.

2. Description of the Related Art

The production and availability of information and media has gained prevalence in today's society. The ability to instantly access and share information, experiences, news, photos, and videos over the internet and on mobile devices has revolutionized the way people connect, learn, consume information, and participate in today's society.

Conventional media services work well for letting a user browse and, in some contexts, search for photo and/or video content. The user can typically browse content within several different scopes, i.e., within a user, within a folder, within a gallery, or globally across accounts. Users can also search for content given a keyword input (e.g., media files tagged with the keyword "family"). However, conventional media services are limited in that the user must manually browse or search when wanting to see if any new content has been added by another member in which the user is interested. There is currently no easy way for a user to assign a set of criteria that filters and automatically return updated content that matches the criteria.

As the foregoing illustrates, there is a need for improved techniques for querying a database of a media service.

SUMMARY

Embodiments disclosed herein generally relate to a method for searching a database. An application receives an input identifying one or more users. The application matches the input to one or more user accounts, each user account corresponding to a user that was identified. The application presents to a requestor public accounts of each identified user account. The application receives a keyword input that filters one or more files in the public accounts. The application receives an input that saves a search comprising the user accounts and the keyword input. The application queries the database using the search. The application presents to the requestor a list of all files found using the search. The application dynamically updates the list to include new files matching a criteria of the search as new files satisfying the search are uploaded to the database.

In another embodiment, a system is disclosed herein. The system includes a processor and memory. The memory has instructions stored thereon, which, when executed by the processor, performs an operation for searching a database. The operation includes an application that receives an input identifying one or more users. The application presents to a requestor public accounts of each identified user account. The application receives a keyword input that filters one or more files in the public accounts. The application receives an input that saves a search comprising the user accounts and the keyword input. The application queries the database using the search. The application presents to the requestor a list of all files found using the search. The application dynamically updates the list to include new files matching a criteria of the search as new files satisfying the search are uploaded to the database.

In another embodiment, a non-transitory computer readable medium is disclosed herein. The non-transitory computer readable medium has instructions stored thereon, which, when executed by a processor, cause the processor to perform a method of searching a database. An application receives an input identifying one or more users. The application matches the input to one or more user accounts, each user account corresponding to a user that was identified. The application presents to a requestor public accounts of each identified user account. The application receives a keyword input that filters one or more files in the public accounts. The application receives an input that saves a search comprising the user accounts and the keyword input. The application queries the database using the search. The application presents to the requestor a list of all files found using the search. The application dynamically updates the list to include new files matching a criteria of the search as new files satisfying the search are uploaded to the database.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments disclosed herein generally relate to a method for searching a database. The application receives an input identifying one or more users. The application matches the input to one or more user accounts, each user account corresponding to a user that was identified. The application presents to a requestor public accounts of each identified user account. The application receives a keyword input that filters one or more files in the public accounts. The application receives an input that saves a search comprising the user accounts and the keyword input. The application queries the database using the search. The application presents to the requestor a list of all files found using the search. The application dynamically updates the list to include new files matching a criteria of the search as new files satisfying the search are uploaded to the database.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media item" as used herein includes, for example, computer files, data, images, photos, documents, other such electronic media, and other resources for storing information, which is available to a computer program and which may be based on some type of durable storage. A file is durable in that it generally remains available for other programs or applications to use after the program or application that created it has finished executing.

Figure 1:
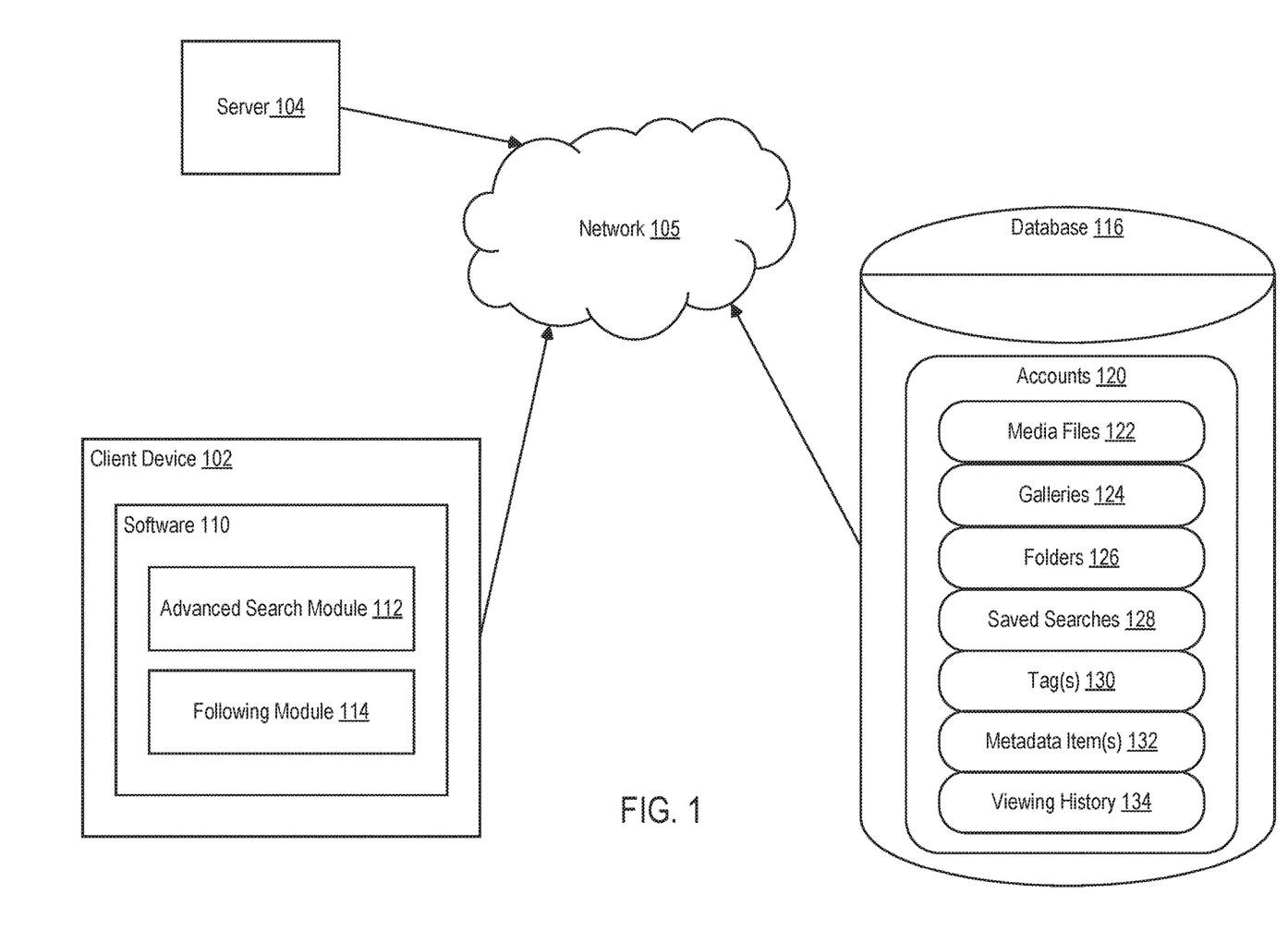
FIG. 1 illustrates a computing environment according to one embodiment.

FIG. 1 illustrates a computing environment 100, according to one embodiment. The computing environment 100 includes a client device 102 and a server 104. The client device 102 and server 104 communicating over network 105. The client device 102 may be any type of computing device accessible by a user, such as, but not limited to, a computer, a mobile device, a tablet, and the like. The server 104 is in communication with a database 116. For example, the server 104 may communicate with the database 116 via a local connection (e.g., Storage Area Network (SAN) or Network Attached Storage (NAS)), over the network 105 or over the Internet (e.g., a cloud based storage service). The server 104 is configured to either directly access data included in the database 116 or to interface with a database manager (not shown) that is configured to manage data included within the database 116.

Database 116 includes one or more accounts 118. The account 118 is a data object that stores data associated with each user. For example, the account 118 may include information such as the user's email address, password, contact information, billing information, and the like. The account 118 may also include one or more media files 120, one or more galleries 124, and one or more folders 126. The one or more media files 120 may include photographs or videos uploaded by a user to the database 116. The one or more media files 120 may be categorized into the one or more folders 126 or one or more galleries 124. For example, given a hierarchy, a given user may have a folder 126 titled "Family," having three galleries 124 (e.g., "Family Reunion 2017," "First Birthday," and "Memorial Day Weekend 2015"), with each of the three galleries 124 comprising a plurality of media files 120. Accordingly, the galleries 124 and folders 126 act as organizational tools for users to organize their respective media files 120.

Additionally, each media file 120, folder 126, and gallery 124 may have one or more tags 130 and one or more metadata items 132 associated therewith. For example, to aid in helping a user categorize his or her media files 120, during upload, a user may be prompted with the option to select or enter one or more tags associated with the media file 120. For example, assume the user uploads a media file 120 that depicts a dog. The user may associate the following tags with the media file 120 of the dog: "dog," "Siberian husky," "puppy," "Rover," and "summer." The "dog," "Siberian husky," "puppy," and "summer" tags may be generalized tags associated with the file management system. The "Rover" tag may be a personalized tag that associates the dog's name, "Rover," with the photograph, so that the user may click on the "Rover" tag in his or her account to bring up all media files associated with "Rover." The metadata items 132 may include information such as the location of where the media file was taken, the type of camera used in capturing the media file, and the like.

A user may access the one or more accounts 120 stored in database 116 with the client device 102. For example, the user may access the one or more accounts 120 stored in database 116 with application 110 installed on client device 102. In some examples, the user may access the one or more media files 120 stored in the database as a "guest," i.e., the user does not have a personal account 118 in the database 116. In another embodiment, the user may access the one or more media files 120 stored in the database, using the account 118 associated with the user. In some embodiments, user may be associated with more than one account 118. Generally, each user may be associated with one or more accounts stored in the database 116.

User may access the media files 120 through the client device 102 by communicating with the server 104. For example, the user may communicate with the server 104 via a web browser on the client device 102 or an application installed on the client device 102. The user accesses one or more media files 120 stored in the database 116 via the network 105 which, in turn, retrieves the online media files 120 from the database 116 and causes the media files to be displayed through a graphical user interface (GUI) of the client device 102. For example, the user may access a digital photograph in an online photo gallery. In this example, the user communicates with the server 104 over the network 105 to retrieve and present a media file from database 116.

As shown, the client device 102 communicates with the server 104 to search for one or more media files 120 in database 116. Current media file storage platforms allow users to browse content within several different scopes. For example, a user can browse media files of another respective user, within a folder of a respective user, within a gallery for a specific user, or even more broadly, globally across all users. Additionally, users may also search for content via one or more keyword inputs. For example, current systems allow a user to search for the keyword "family," wherein the user will be provided with all files having the keyword "family" associated therewith. Current systems are limited, however, in that a user may manually browse or search when wanting to see if any new content has been added by a user in whom they are interested. Continuing with the above example, if at time A, a user searched for the keyword "family," the user would not receive additional files satisfying the "family" search if they are uploaded to the database 116 at a subsequent time, time B.

The application 110 may include an advanced search module 112 and following module 114. The advanced search module 112 and following module 114 work in conjunction to provide a streamline method for returning updated content that matches a user's search request. The advanced search module 112 is configured to allow the user to build a multi-layered search command. For example, the advanced search module 112 allows a user to search through media files 120 hosted on database 116 using a string of terms such as, for example, "user+folder+tag," where user corresponds to a given user of an account 118, folder corresponds to a given folder within the account 118, and tag corresponds to a given tag of a media file 120 in the given folder. The following module 114 is configured to maintain the advanced searches generated by the user in the advanced search module 112, and provide the user with results from advanced searches. For example, the following module 114 may generate a "feed" that illustrates, chronologically, one or more media files 120 that satisfy the constraints of the advanced search.

The database 116 may further include one or more saved searches 128. Each of the saved searches 128 correspond to a search command generated by the user using the advanced search module 112. For example, the advanced search module 112 may save "user+folder+tag to database 116. Saving the searches to the database 116 allows the following module 114 to periodically query the database 116 using the saved searches 128, such that the following module 114 can present to the user new media files satisfying the constraints of the saved searches 128 as they are uploaded. Additionally, in some embodiments, the database 116 may further include a viewing history 134. The viewing history 134 keeps a log of all media files 120 the user viewed. Accordingly, this allows the following module 114 to mark, for example, each media file 120 satisfying the constraints of a saved search 128, as "new," such that the user can be notified. Thus, when the user views their followed feed, the user would see mixed list of media files or galleries from the saved searches in order of recency.

Figure 2:
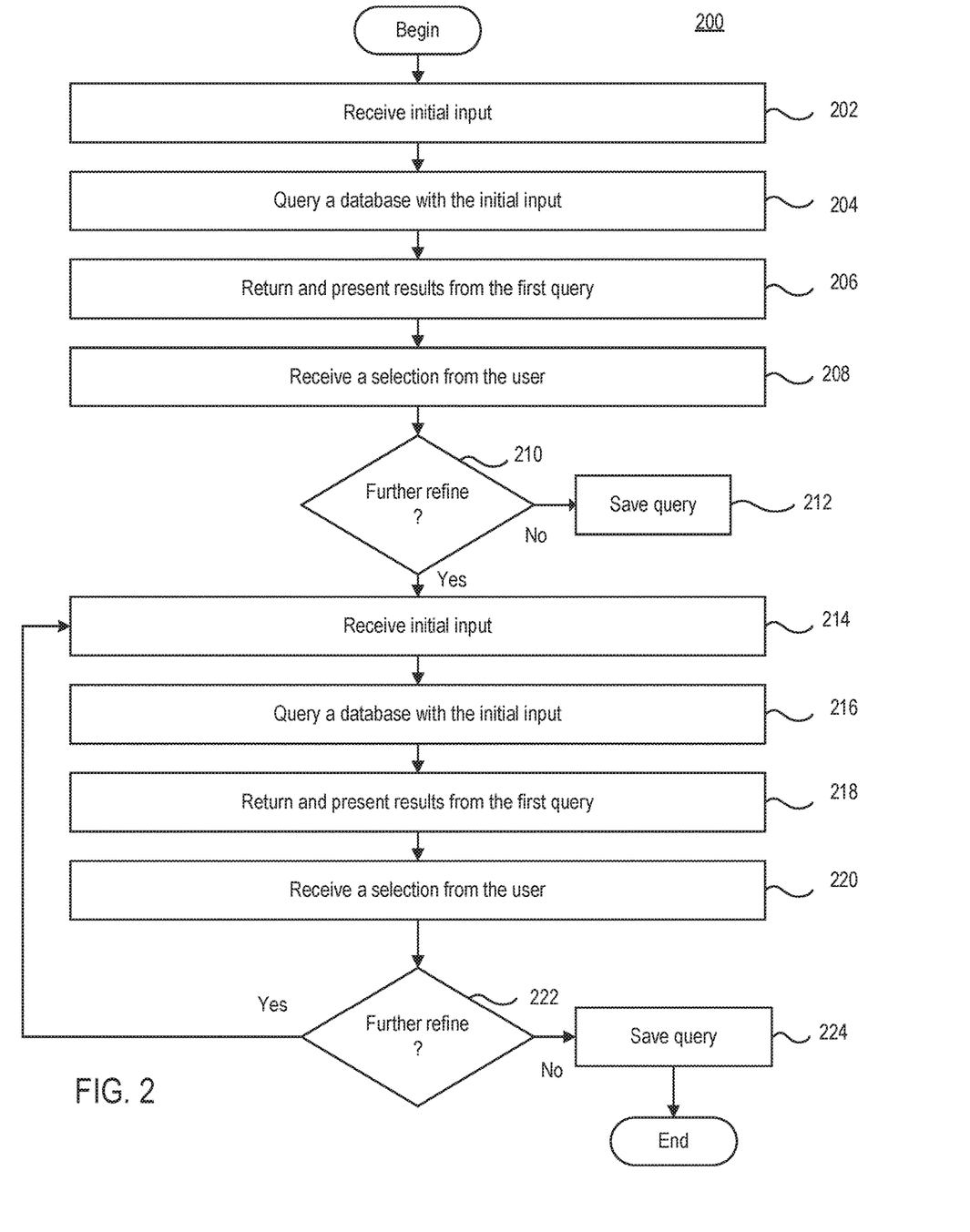
FIG. 2 is a flow diagram illustrating a method of querying a database according to one embodiment.
Figure 3A:
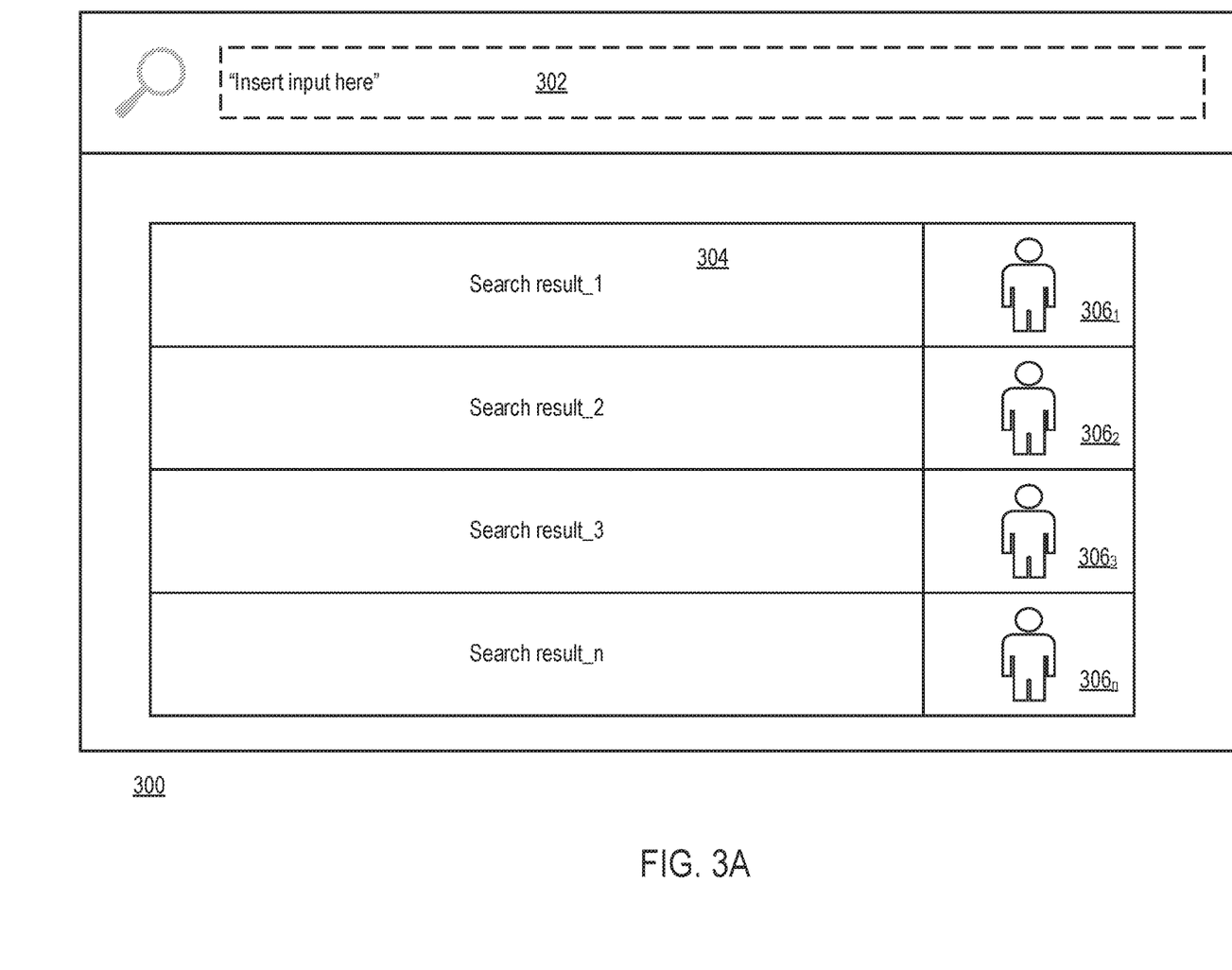
FIGS. 3A-3C illustrate graphical user interfaces corresponding to one or more steps in the method of FIG. 2 according to one embodiment.
Figure 3B:
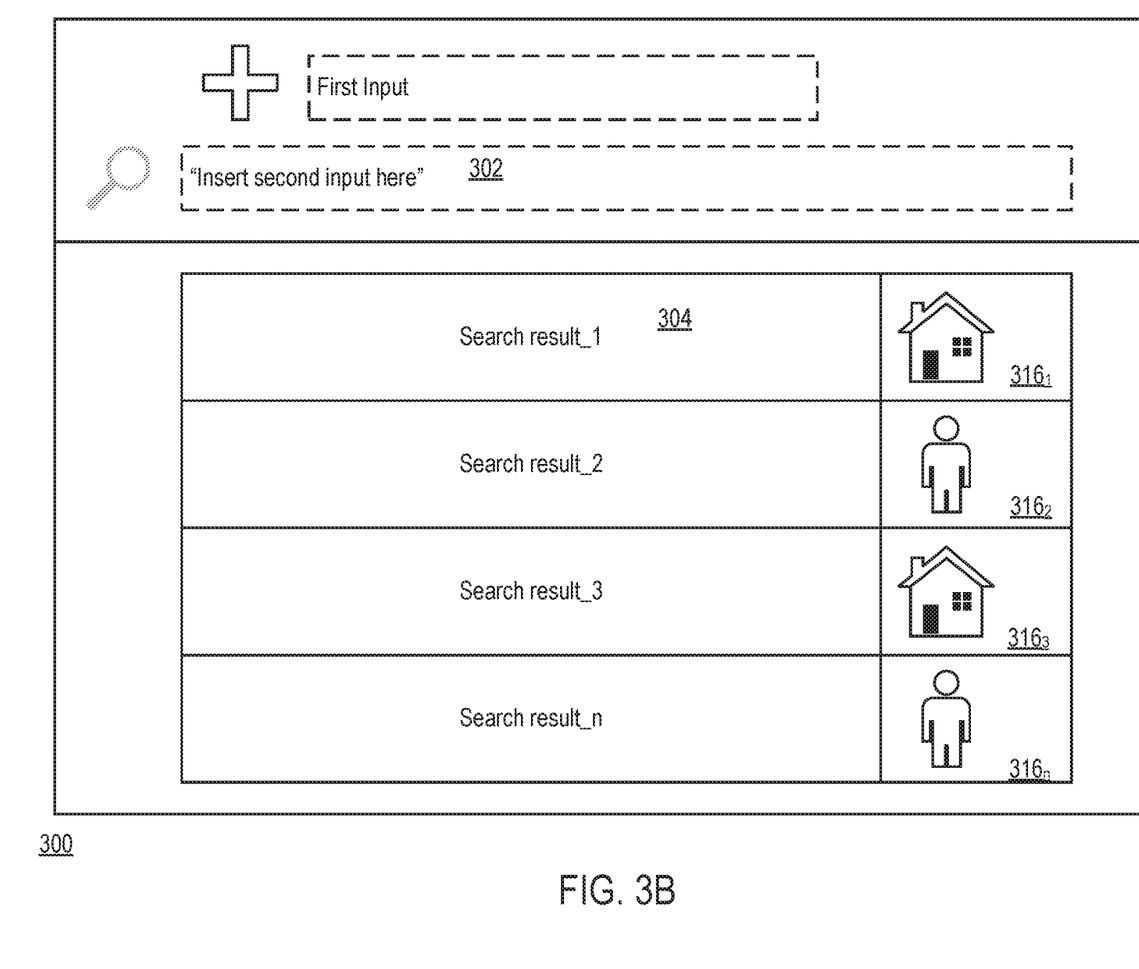
Figure 3C:
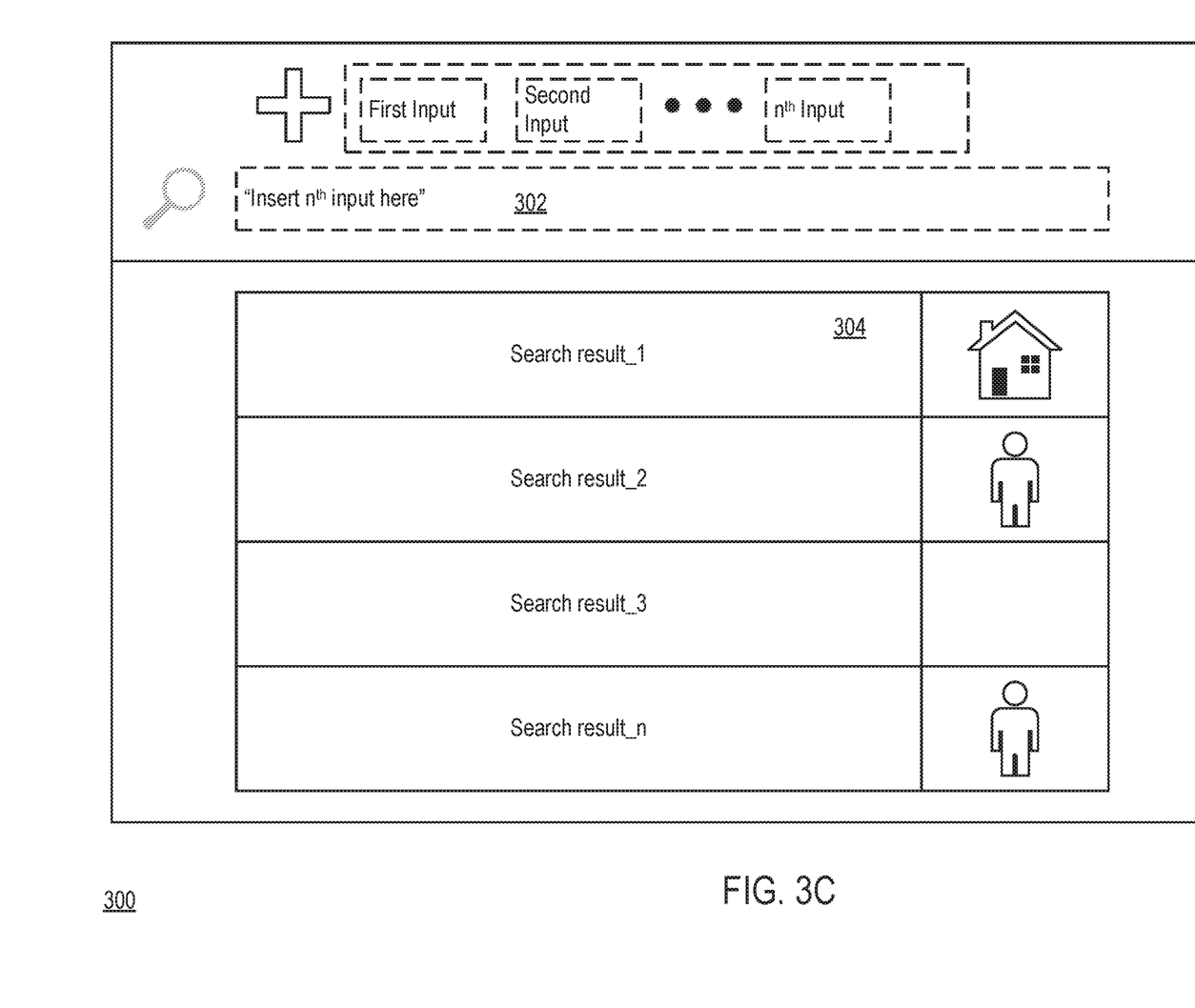

FIG. 2 is a flow diagram illustrating a method 200 of creating a saved search, according to one embodiment. FIGS. 3A-3C illustrate graphical user interfaces (GUI) corresponding to one or more steps in method 200.

Method 200 begins at step 202. At step 202, application 110 receives a first search input from the user. In one example, application 110 receives a first input from the user identifying a search term associated with one or more tags associated with one or more media files 120 in the database 116. In another example, application 110 receives a first input from the user identifying a search term associated with one or more galleries 124. In yet another example, application 110 receives a first input from the user identifying a search term associated with one or more folders 126. In the present example, application 110 receives a first search input from the user 101 identifying one or more user accounts 120 in database 116.

At step 204, application 110 queries the database 116 using the first input. For example, application 110 queries the database 116 using the first input to identify one or more accounts associated with the first input. Each user account corresponds to a user identified by the first search input. In some embodiments, step 204 makes use of a two-part search, based on the received input. For example, a user may enter a user's name, an account nickname, or the like as the first input. The advanced search module 112 attempts to resolve an exact match for the input (e.g., when an account nickname is entered) via a second search, in order to prioritize a user typing in an exact account name, if known. Such prioritization may not be guaranteed by a general search. The second search may use a separate application programming interface (API) call to load account details for a specific account name associated with an entered account nickname.

FIG. 3A illustrate a GUI 300 of application 110 corresponding to steps 202 and 204 of method 200 discussed above. For example, the GUI 300 illustrates a search field 302 and a results field 304. The search field 302 is configured to receive a first search input from the user 101. Continuing with the above example, search field 302 is configured to receive a first search input directed to a user account identifier, such as the exact name of the account or a user account nickname. The results field 304 presents one or more listings of results from querying the first search input against the database 116. In one embodiment, application 110 may populate the results field 304 with matches as the user types each letter of the first search input in the search field 302. For example, assuming the user's first input is "Dan," after the user types "D," application 110 may populate the results field 304 with each user account including the letter D. In an embodiment, the results field 304 may be set, by default, to show the most relevant results first. Thus, when the user types the letter "D" first, account names starting with the letter "D" are shown first, followed by account names that merely include the letter "D." Additionally, after the user types the letter "a" resulting in "Da," the application 110 may populate the results field 304 with each user account including the string "Da." In some embodiments, after the user has entered the desired string as the first search input, user may be provided with the option to sort the results alphabetically, date created, relevance, most popular, and the like.

Referring back to FIG. 2, at step 206, the application presents to the requestor the public accounts of matched to the input. Continuing with the above example, the user inputs the string "Dan" as the first search input. Application 110 queries the string "Dan" against database 116 to return all accounts including the string "Dan." As shown, the first search input returned User Account_, User Account_2, User Account_3, and, generally, User Account_N. For each result, application 110 may also return a default photo $306_1$-306, associated therewith. The default photo $306_1$-306, may be an image selected by the user of the account. If the user does not have a default photo $306_1$-306, then application 110 may return a generalized silhouette image. For example, for User Account 1, application 110 returns default photo $306_1$, User Account_2 returns default photo $306_2$; User Account_3 returns silhouette image $306_3$; and User Account_N returns default photo 306.

At step 208, the application 110 receives a selection of one or more accounts that were presented to the user. For example, the user may select User Accounti and User Account_2. For purposes, of this application, assume that the user selects only User Accounti.

At decision block 210, the application determines whether a user wants to further refine the querying of the database. If the application 110 receives an indication that the user does not want to further refine the querying of the database, then at step 212, application 110 saves the present query. Continuing with the above example, if the application receives an indication from the user that the user does not want to further refine the querying of the database, then at step 212, applications 110 saves the first input as a saved query.

If, however, at decision block 210, the application 110 receives an indication from the user to further refine the query, then at step 214, application 110 receives an additional input from the user. Generally, the additional input from the user may be an input configured to confine the search in combination with the first input, rather than an input that expands the original search results. For example, assuming that the first selection from the user was directed to User 1, the additional input is in the form of a search term directed to a folder, gallery, keyword, or metadata item within the user account. Continuing with above example, the additional input of the user may be "dog" further limiting the User Account_1 selection. At step 216, application 110 queries the database 116 with a combination of all inputs. For example, application 110 queries the database with the first selection in combination with the additional search term.

FIG. 3B illustrate the GUI 300 of application 110 corresponding to step 214 of method 200 discussed above. The search field 302 is configured to receive the additional search input from the user 101. Continuing with the above example, search field 302 is configured to receive a second search input configured to further refine the first search results. For example, application 110 receives an additional search term in the form of "dogs." The results field 304 presents one or more listings of results from querying the combination of the first search input and the additional search input against the database 116. In one embodiment, application 110 may populate the results field 304 with matches as the user types each letter of the additional search input in the search field 302. In some embodiments, after the user 101 has entered the desired string as the first search input, user may be provided with the option to sort the results alphabetically, date created, relevance, most popular, and the like.

Referring back to FIG. 2, at step 218, the application 110 presents to the requestor the results matched to the combination of inputs. Continuing with the above example, the user inputs the string "Dan" as the first search input and the string "dog" as the second input. Application 110 queries the string "user(Dan_1)+dog" against database 116 to return all results, where "user(Dan_1)" corresponds to the previously selected Dan_1 account that was selected. As shown, the first search input returned Galleryi, Folder_1, Gallery_2, and, generally, Search Result_N. For each result, application 110 may also return a default photo $316_1$-316, associated therewith. The default photo $316_1$-316, may be an image associated with the specific search result. For example, for Gallery_1, application 110 returns default photo $316_1$ previewing a media file in Galleryi; application 110 returns default photo $316_2$ previewing a media file in Folder_1; application 110 returns default photo $316_3$ previewing a media file in Gallery_2; and application 110 returns default photo $316_N$ previewing a media file associated with Search Result_N.

At step 220, the application 110 receives a selection of one or more search results that were presented to the user. For example, the user may select Search Resulti and Search Result_2. For purposes, of this application, assume that the user selects only Search Resulti. For example, Search Resulti is directed to a folder titled, "dogs." Thus, the subsequent querying of the database 116 would result in a search such as "User(Dan_1) AND Folder(dogs)."

At decision block 222, the application determines whether a user wants to further refine the querying of the database. If the application 110 receives an indication that the user does not want to further refine the querying of the database, then at step 224, application 110 saves the present query. Continuing with the above example, if the application receives an indication from the user that the user does not want to further refine the querying of the database, then at step 222, applications 110 saves the combination of the first input and the second input as a saved query.

If, however, at decision block 222, the application 110 determines whether a user wants to further refine the querying of the database. For example, in this case, method 200 reverts to step 214 in which an additional input is received. Generally, the application 110 may continue to receive additional input from the user that is configured to further confine the querying of the database. For example, the application 110 will query the database with the string of inputs that is eventually saved by the user as a saved search.

FIG. 3C illustrates the GUI 300 of application 110 corresponding to subsequent inputs according to the method discussed above. The search field 302 is configured to receive additional search input from the user. Continuing with the above example, search field 302 is configured to receive a third search input configured to further refine the second search results. For example, application 110 receives an additional search term in the form of "Iceland," to identify those galleries in the folder titled Dogs of user Dan_1. The results field 304 presents one or more listings of results from querying the combination of the first search input and the additional search inputs (second search input and third search input) against the database 116. For example, example the results field 304 may present results in light of a search "User(Dan_1) AND Folder(dogs) AND Gallery(Iceland)." In one embodiment, application 110 may populate the results field 304 with matches as the user types each letter of the additional search input in the search field 302. In some embodiments, after the user 101 has entered the desired string as the first search input, user may be provided with the option to sort the results alphabetically, date created, relevance, most popular, and the like.

Generally, as shown in FIG. 3C, the application 110 may be configured to receive a total of n-inputs that is used as a combination to query database 116. The inputs may comprise search terms related to user accounts, folders, galleries, tags, and photo metadata that may be used to generate a saved search for the user.

Figure 4:
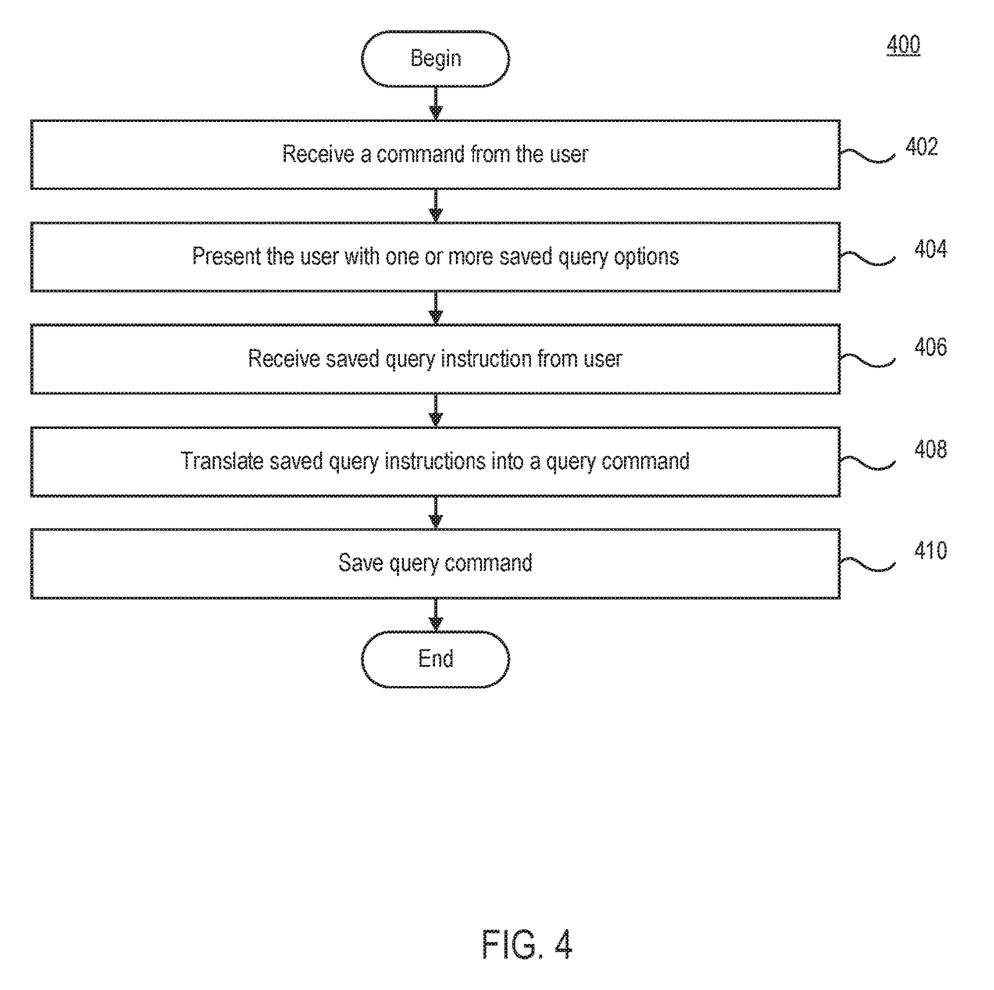
FIG. 4 is a flow diagram illustrating a method of querying a database according to one embodiment.

FIG. 4 is a flow diagram illustrating a method 400 of creating a saved search, according to one embodiment. The method 400 begins at step 402. At step 402, application 110 receives a command from the user. For example, the user has navigated to a hierarchy in application 110. In the hierarchy, the user has come across another user's account, folder, gallery, or photo. Responsive to the user determining that the user wishes to follow the user's account, folder, gallery, photo tag, or photo metadata, application 110 receives a command from the user. In one embodiment, such as those on which the client device is a desktop or laptop computing device, application 110 may receive a right-click command. In another embodiment, such as those on which the client device is a touch screen device (e.g., mobile device, tablet, and the like), application 110 may receive a long-touch command. In yet another embodiment, such as that in which application 110 presents the user with a selectable icon, application 110 may receive a selection command on the selectable icon.

At step 404, the application 110 presents the user with one or more saved query options. For example, as a result of the command in step 402, application 110 may present the user with a drop-down menu such that the user can choose to "follow" the user, folder, gallery, tag, or metadata to which the user has navigated. At step 406, the application 110 receives the saved search instructions from the user. For example, the application 110 receives the save query instructions from the user in the form of the user selecting to follow a user, folder, gallery, tag, or metadata.

At step 408, the application 110 translates the follow request into a query command. For example, in response to the user requesting to follow a specific folder of the user, application 110 may translate the follow request into a query command based on the location of the folder in database 116. Continuing with this example, a path for the folder might be: Database://user_1/folder_2. Using this information, application 110 may translate the follow request into a query, such as "user(user_1) AND folder (folder_2)." In another example, a path for a metadata item may be: Database://metadatai. This may be translated to a query in the form of "metadata(metadata_1)." In another example, a path for a metadata item may be more specific, such as: Database://user_1/folder_1/metadatai. This may be translated to a query in the form of "user(user_1) AND folder (folder_1) AND metadata(metadata_1)."

At step 410, the application 110 saves the query into the database 116. For example, the application 110 saves the query into the saved searches 128 associated with the user's account.

Figure 5:
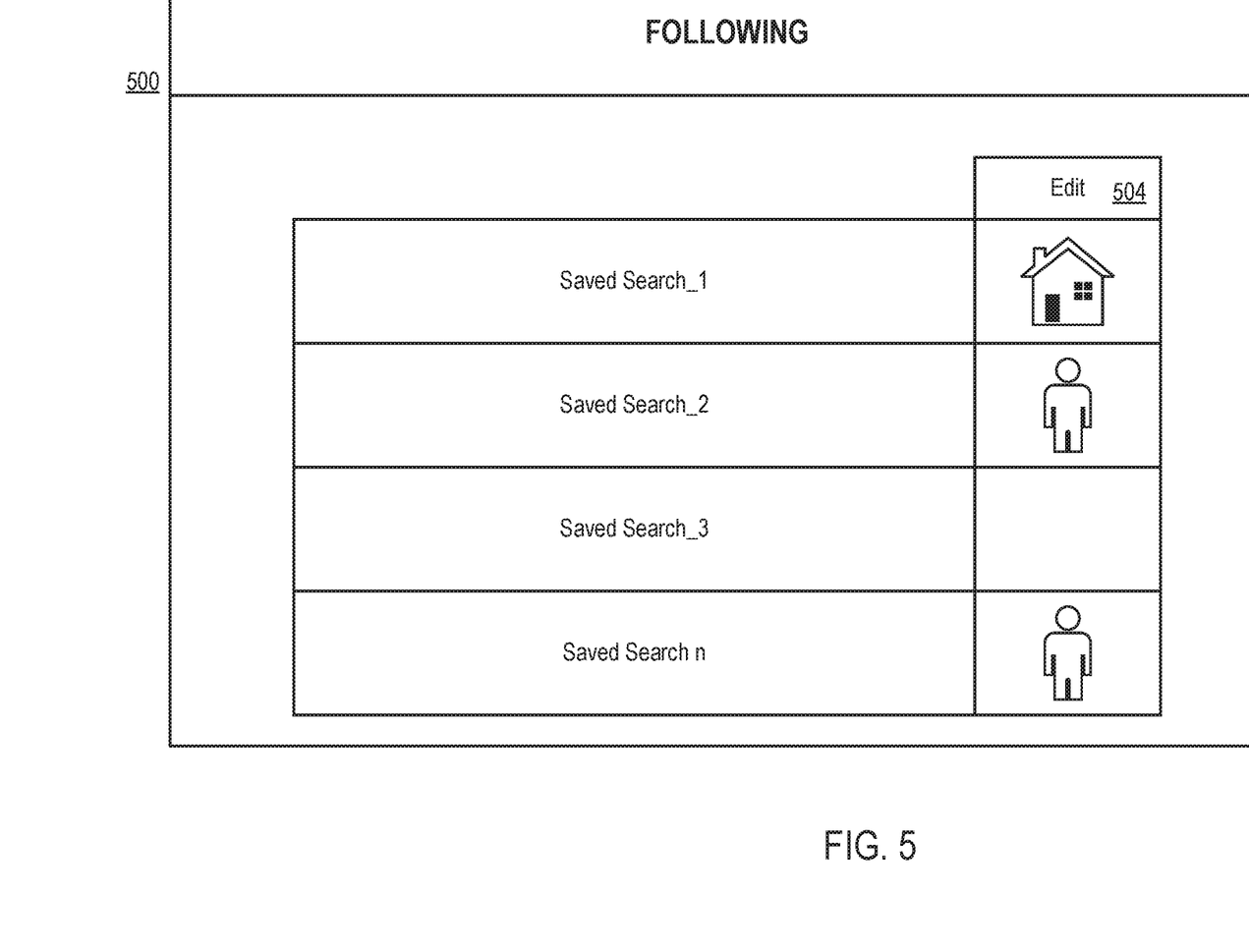
FIG. 5 illustrates a graphical user interface corresponding to one or more steps in the method of FIG. 2 according to one embodiment.

FIG. 5 illustrates a GUI 500 of application 110, according to one embodiment. For example, the embodiment shown in FIG. 5 is a GUI illustrating the following page of application 110. The GUI 500 illustrate a listing of saved searches 128 of the user. For example, GUI 500 illustrates Saved Search_1, Saved Search_2, Saved Search_3, and, generally, Saved Search_n. In one example, Saved Search_1 may be the query "account(User_1) AND gallery (gallery_1) AND tag(tag_1)." In one example, Saved Search_2 may be the query "account(User_1) AND account (User_1) AND folder (vacation)." In one example, Saved Search_3 may be the query "account(User_4) AND meta-data(Camera_Brand_1)." In one example, Saved Search_n may generally be "account(User_n) AND folder(folder_n) AND gallery (gallery_n) AND keyworkd (keyword_n)."

In some embodiments, GUI 500 may include an edit button 504. The edit button 504 allows the user to edit the listing of saved searches. For example, by selecting the edit button 504, a user can choose to remove a saved search from the listing of saved searches 128. Accordingly, application 110 will remove the saved search from the saved searches 128 in user's account.

Figure 6:
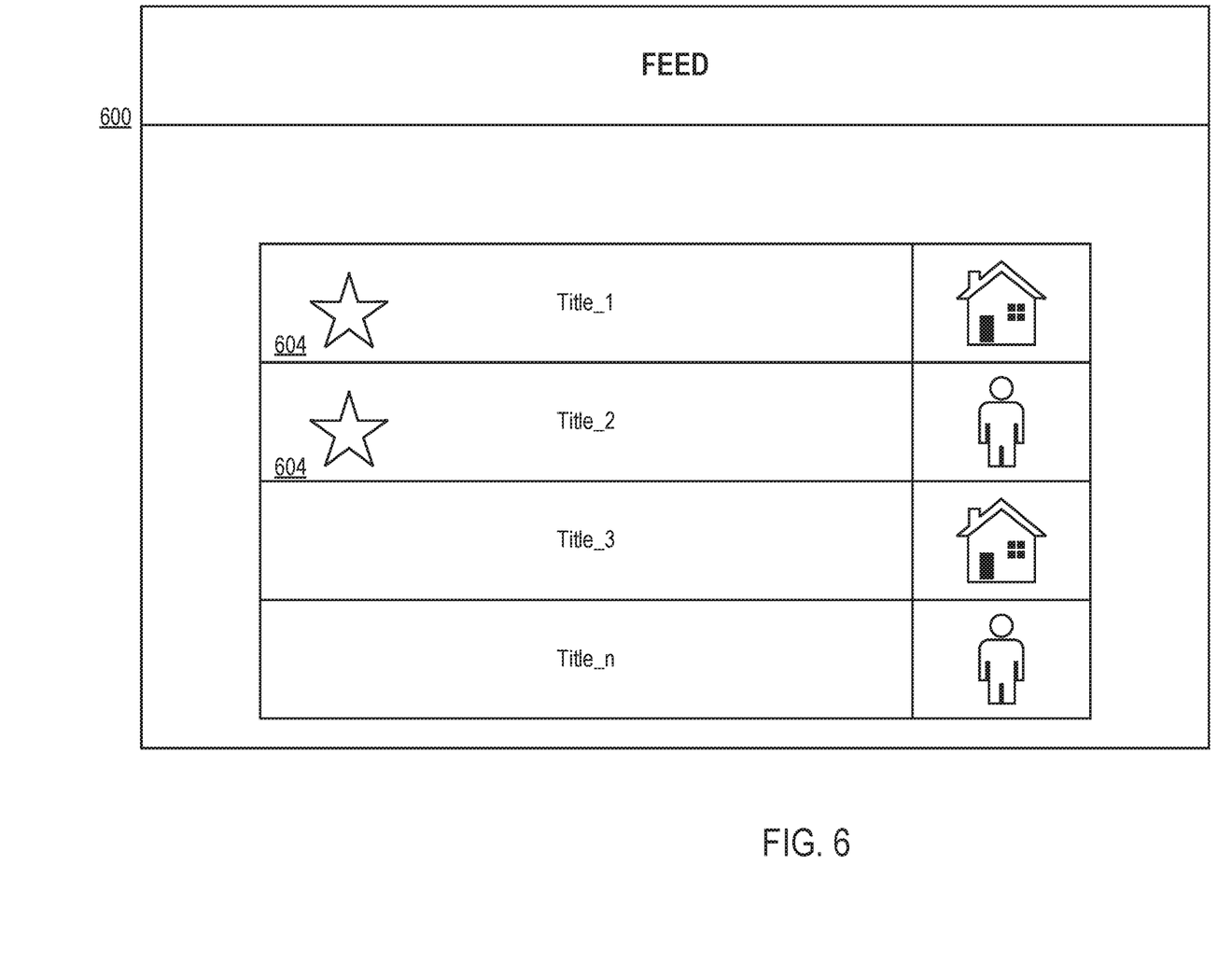
FIG. 6 illustrates a graphical user interface corresponding to one or more steps in the method of FIG. 2 according to one embodiment.

FIG. 6 illustrates a GUI 600 of application 110, according to one example. For example, the embodiment shown in FIG. 6 is a GUI illustrating a feed page of the application 110. The feed page includes a listing of search results from the saved searches in the listing from FIG. 5. In one embodiment, application 110 compiles listing by querying each saved search 128 against the database 116. Over time, as new results that satisfy the constraints of each saved search 128 is uploaded, or added, to database 116, application 110 will dynamically update the list to include these new media files.

In some embodiments, application 110 maintains a viewing history 134 of the user in the user's account 118. For example, application 110 will note each media file in the feed that the user has viewed. Accordingly, when subsequent files are added to the database 116 that meet the criteria of a saved search 128, application 110 may add an identifier 604 to the file, indicating to the user that the user has not yet viewed this media file. For example, application 110 may determine that user has previously viewed media file_3 and media file_n. However, application 110 may determine that media filesi and_2 are new, and thus, not yet viewed by the user. Accordingly, application 110 has added the identifier 604 to media file_1 and media file_2 to notify the user that the media filesi and_2 are new.

In some embodiments, application 110 may alert the user when new media files matching the constraints of a saved search 128 are available. In one example, application 110 may send a push notification to the user to notify the user that a new media file is available. In another example, application 110 may email the user to notify the user that new media file is available. Accordingly, application 110 may implement any suitable method to notify the user that new media files matching a user's saved search is available.

Figure 7:
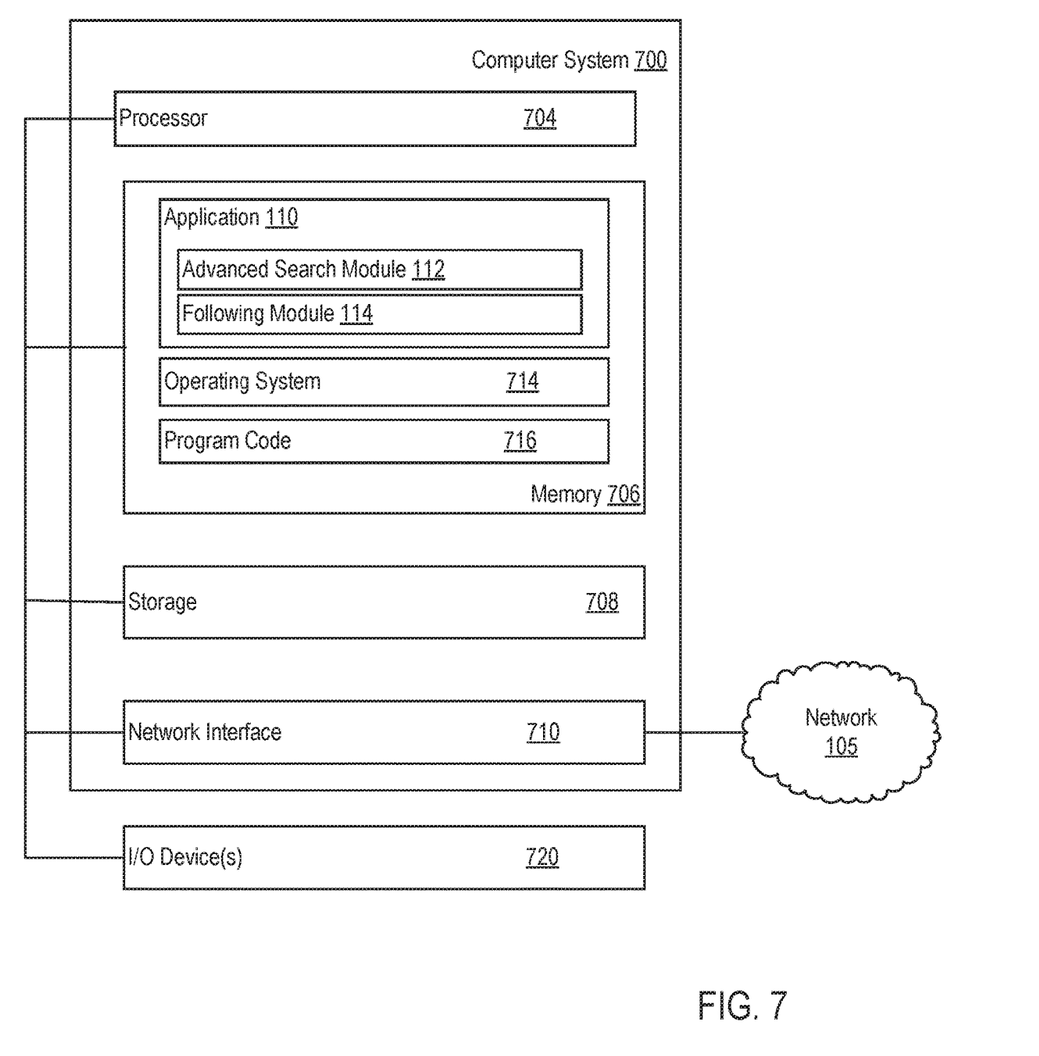
FIG. 7 illustrates a computer system, such as client device from FIG. 1 according to one embodiment.

FIG. 7 illustrates a computer system 700, such as client device 102, according to one embodiment. The computer system 700 includes a processor 704, a memory 706, storage 708, and a network interface 710. The computer system 700 may be coupled to I/O devices 720. The processor 704 may be any processor capable of performing the functions described herein. The computer system 700 may connect to the network 105 using the network interface 710. Furthermore, as will be understood by one of ordinary skill in the art, any computer system capable of performing the functions described herein may be used.

In the embodiment shown in FIG. 7, the memory 706 includes the application 110. The application 110 may include an advanced search module 112 and following module 114. The advanced search module 112 and following module 114 work in conjunction to provide a streamline method for returning updated content that matches a user's search request. The advanced search module 112 is configured to allow the user to build a multi-layered search command. For example, the advanced search module 112 allows a user to search through media files hosted on a remote database using a string of terms such as, for example, "User+folder+tag," where user corresponds to a given user of an account 118. The following module 114 is configured to maintain the advanced searches generated by the user in the advanced search module, and provide the user with results from advanced searches. For example, the following module may generate a "feed" that illustrates, chronologically, one or more media files that satisfy the constraints of the advanced search.

In the pictured embodiment, the memory 706 contains an operating system 714 and program code 716. Although memory 706 is shown as a single entity, memory 706 may include one or more memory devices having blocks of memory associated with physical addresses, such as random access memory (RAM), read only memory (ROM), flash memory, or other types of volatile and/or non-volatile memory. The program code 716 is configured to carry out the method for querying a database, in conjunction with FIGS. 2 and 4, respectively. The memory 706 is an example of tangible media configured to store data, such as trace data, APIs invoked, and the like. Other types of tangible media include floppy disks, removable hard drives, optical storage media, such as CD-ROMs and DVDs, bar codes, and the like.

Embodiments disclosed herein generally relate to a method, system, and non-transitory computer readable medium for searching a database. The application receives an input identifying one or more users. The application matches the input to one or more user accounts, each user account corresponding to a user that was identified. The application presents to a requestor public accounts of each identified user account. The application receives a keyword input that filters one or more files in the public accounts. The application receives an input that saves a search comprising the user accounts and the keyword input. The application queries the database using the search. The application presents to the requestor a list of all files found using the search.

The application dynamically updates the list to include new files matching a criteria of the search as new files satisfying the search are uploaded to the database.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the illustrated purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may access a first file storage location, such as a personal web page hosted by a server, on a remote device by a link accessed via a second graphical user interface. The user may upload and/or transfer media files from a second file storage location accessed via the second graphical user interface to the first file storage location. The link may allow a user to send a link via a data network that will allow the user to quickly log in and upload media files from the remote device, which accesses the link. As such, the media files accessible by the remote device may be transferred from the second storage location of the remote device to the first storage location.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings

What is claimed is:

1. A method of searching a database, the method comprising:
   evaluating a set of digital media corresponding to activity by a requestor device, wherein the digital media in the set are evaluated to identify one or more associated user accounts and one or more digital media folders associated with the one or more user accounts, wherein the digital media folders contain the set of digital media;
   generating a display for the requestor device, the display including the set of digital media corresponding to the activity by the requestor device and one or more selectable criteria associated with the set of digital media;
   receiving a follow request associated with a search criterion from the requestor device, the search criterion selected from among the selectable criteria in the generated display;
   translating the follow request into a query command based on one or more paths associated with the identified user accounts and one or more paths associated with the selected search criterion, wherein the one or more paths include information regarding metadata, the one or more user accounts, and a digital media folder associated with the set of digital media;
   saving the query command in memory, wherein the query command is stored in association with the requestor device; and
   generating a feed for the requestor device based on the saved query command, wherein the feed includes a chronological list of digital media associated with the saved query command, wherein the chronological list is dynamically updated to include new digital media that match the saved query command when the matching new digital media is uploaded to an associated location within the database.

2. The method of claim 1, wherein evaluating the set of digital media corresponding to the activity by the requestor device includes identifying one or more inputs received from the requestor device associated with the set of digital media stored in the database.

3. The method of claim 2, wherein the one or more inputs include a selection of at least one of a tag, a digital media folder, a user account, or metadata associated with the set of digital media.

4. The method of claim 2, wherein evaluating the set of digital media includes querying the database based on a combination of the one or more inputs, wherein each subsequent input in the combination confine a query result corresponding to one or more prior inputs in the combination.

5. The method of claim 1, wherein generating the display for the requestor device includes generating a list of the one of more digital media folders.

6. The method of claim 1, wherein the one or more selectable criteria associated with the set of digital media includes a tag, a digital media folder, a user account, or metadata associated with the displayed digital media.

7. The method of claim 1, further comprising maintaining a viewing history in memory, wherein the viewing history includes each digital media viewed by the requestor device in the feed.

8. The method of claim 7, further comprising updating the feed to include an identifier of the digital media, wherein the identifier is based on the maintained viewing history.

9. The method of claim 1, further comprising receiving an input to remove the query command from memory, wherein the feed is dynamically updated to exclude the digital media associated with the removed query command.

10. A system of searching a database, the system comprising:
a memory; and
a processor that executes instructions stored in memory, wherein execution of the instructions by the processor:
evaluates a set of digital media corresponding to activity by a requestor device, wherein the digital media in the set are evaluated to identify one or more associated user accounts and one or more digital media folders associated with the one or more user accounts, wherein the digital media folders contain the set of digital media;
generates a display for the requestor device, the display including the set of digital media corresponding to the activity by the requestor device and one or more selectable criteria associated with the set of digital media;
receives a follow request associated with a search criterion from the requestor device, the search criterion selected from among the selectable criteria in the generated display;
translates the follow request into a query command based on one or more paths associated with the identified user accounts and one or more paths associated with the selected search criterion, wherein the one or more paths include information regarding metadata, the one or more user accounts, and a digital media folder associated with the set of digital media;
saves the query command in memory, wherein the query command is stored in association with a location within a database; and
generates a feed for the requestor device based on the saved query command, wherein the feed includes a chronological list of digital media associated with the saved query command, wherein the chronological list is dynamically updated to include new digital media that match the saved query command when the matching new digital media is uploaded to an associated location within the database.

11. The system of claim 10, wherein the activity by the requestor device includes transmitting by the requestor device one or more inputs associated with the set of digital media stored in the database.

12. The system of claim 11, wherein the one or more inputs includes a selection of at least one of a tag, a digital media folder, a user account, or metadata associated with the set of digital media.

13. The system of claim 11, wherein the set of digital media is evaluated by querying the database based on a combination of the one or more inputs, wherein each subsequent inputs in the combination confine a query result corresponding to one or more prior inputs in the combination.

14. The system of claim 10, wherein the display for the requestor device includes a list of the one of more digital media folders.

15. The system of claim 10, wherein the one or more selectable criteria associated with the set of digital media includes a tag, a digital media folder, a user account, or metadata associated with the displayed digital media.

16. The system of claim 10, wherein the processor further executes instructions to maintain a viewing history, wherein the viewing history includes each digital media viewed by the requestor device in the feed.

17. The system of claim 16, wherein the processor further executes instructions to update the feed to include an identifier of the digital media, wherein the identifier is based on the maintained viewing history.

18. The system of claim 10, wherein the processor further executes instructions to receive an input to remove the query command from memory, wherein the feed is dynamically updated to exclude the digital media associated with the removed query command.

19. A non-transitory, computer-readable storage medium, having instructions encoded thereon, the instructions executable by a processor to perform a method of searching a database, the method comprising:
evaluating a set of digital media corresponding to activity by a requestor device, wherein the digital media in the set are evaluated to identify one or more associated user accounts and one or more digital media folders associated with the one or more user accounts, wherein the digital media folders contain the set of digital media;
generating a display for the requestor device, the display including the set of digital media corresponding to the activity by the requestor device and one or more selectable criteria associated with the set of digital media;
receiving a follow request associated with a search criterion from the requestor device, the search criterion selected from among the selectable criteria in the generated display;
translating the follow request into a query command based on one or more paths associated with the identified user accounts and one or more paths associated with the selected search criterion, wherein the one or more paths include information regarding metadata, the one or more user accounts, and a digital media folder associated with the set of digital media;
saving the query command in memory, wherein the query command is stored in association with a location within a database; and
generating a feed for the requestor device based on the saved query command, wherein the feed includes a chronological list of digital media associated with the saved query command, wherein the chronological list is dynamically updated to include new digital media that match the saved query command when the matching new digital media is uploaded to an associated location within the database.

\* \* \* \* \*